March 30, 1937. A. C. SMITH ET AL 2,075,669
CONNECTER AND SWITCH FOR CONTROL CIRCUITS
Filed May 22, 1936
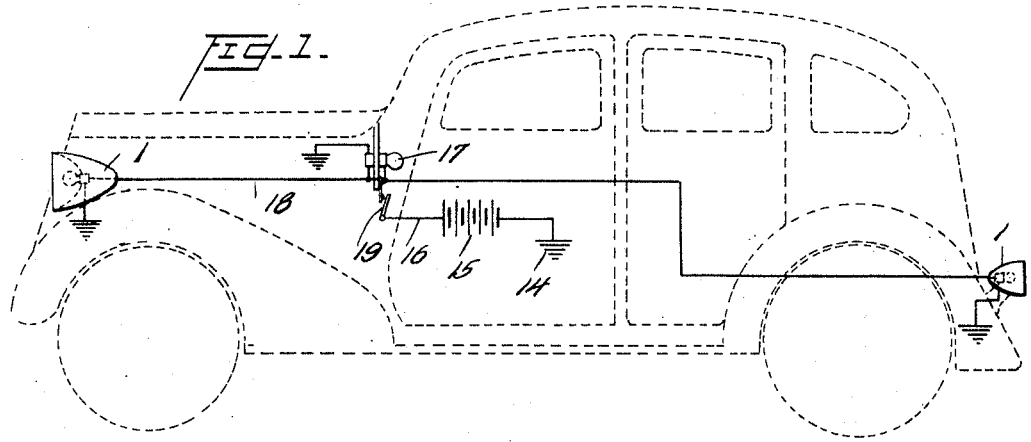
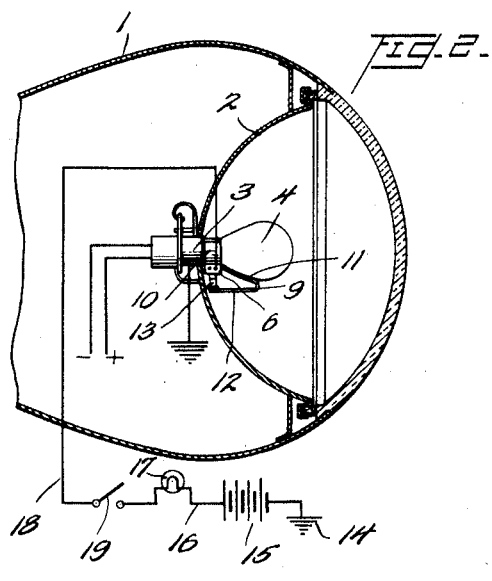
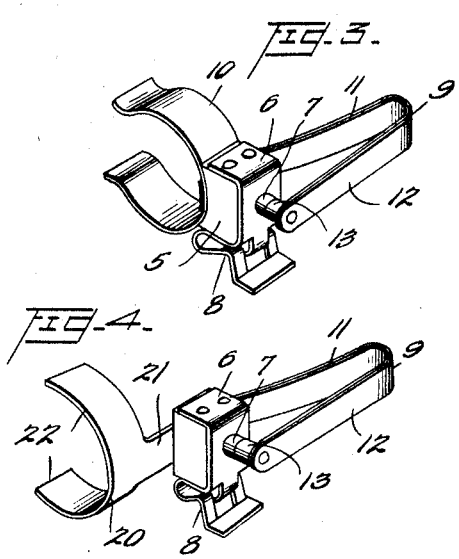
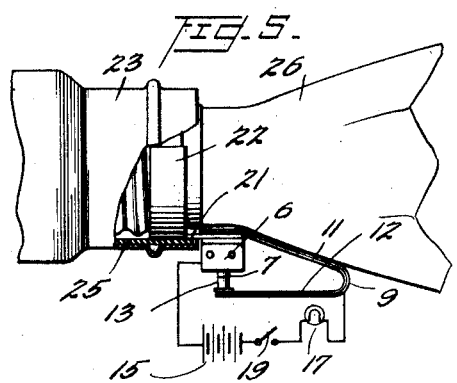
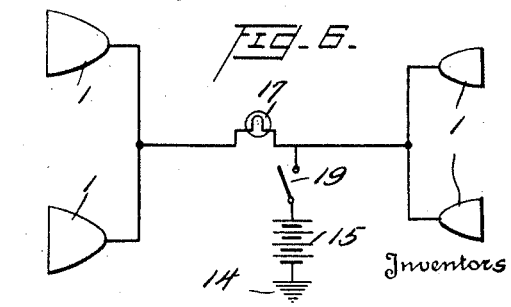
Inventors
Albert C. Smith
Charles F. Robbins
Attorney Patented Mar. 30, 1937

2,075,669

UNITED STATES PATENT OFFICE 2,075,669

CONNECTER AND SWITCH FOR CONTROL CIRCUITS

Albert C. Smith, Watkins Glen, and Charles F. Robbins, Glenora, N. Y.

Application May 22, 1936, Serial No. 81,322

10 Claims. (Cl. 177—311)

This invention relates to means for indicating a variance from an established condition in an electrical circuit having connected therein electrical translating devices, particularly those used for illumination. More particularly, it relates to a quick detachable connecter embodying a thermostatically operated circuit maker and breaker comprising a combined structure arranged for connection in a signaling circuit and for quick detachable engagement with a lamp base and/or its socket.

In electric lighting circuits, it becomes necessary in many applications to provide under certain conditions illumination, the failure of which would create a dangerous condition. This is particularly true with relation to hazardous places requiring constant illumination and in connection with the running lights of vehicles wherein failure of one or more of the lights may occur without the knowledge of the operator. Very serious accidents have been occasioned by such failures of running lights and many of the States have fixed penalties and fines for operation of vehicles in night driving without the prescribed complement of lights. Operators of motor vehicles have been subjected to the penalties and fines without knowing of the offending condition.

It is one of the objects of the invention to minimize accidents and other difficulties attributable to light failure in night driving of vehicles and in the illumination of places which would otherwise be dangerous, by providing indicating means in a signaling circuit responsive to failure of a light or lights, to indicate immediately at a remote position to an operator or attendant the light failure condition.

A further object of the invention is the provision of means for indicating the condition of electric lights in a circuit which is capable of easy application to existing lighting systems without necessitating substantial structural changes.

A further object of the invention is the provision of a combination quick detachable connecter and thermostatic switch adapted for detachable association with an incandescent lamp and/or its cooperating socket and with signal conductors.

Further objects and advantages of the invention will be apparent from the detailed description embodied in the following specification and by reference to the drawing referred to therein.

In the drawing, like reference numerals represent like parts throughout the several views, in which, Figure 1 is a diagrammatic illustration of the invention in application to an automobile lighting system.

Figure 2 is a sectional view of an automobile headlight structure showing one form of combined thermostatic switch and connecter of the invention applied to the lamp base.

Figure 3 is an enlarged perspective view of the connecter switch structure of Fig. 2.

Figure 4 is a perspective view of a modified form of connecter switch for application to an ordinary screw shell socket and lamp combination.

Figure 5 shows a view partly in section of a conventional screw shell socket with the device of Fig. 4 associated therewith.

Figure 6 is a schematic wiring diagram showing the application of the signal circuits utilizing the connecter switches of the invention.

Application of the invention to the lighting system of an automobile is illustrated in Figs. 1 and 2 of the drawing. This lighting system, of conventional kind, embodies front and rear lights generally including a casing 1, reflector 2, lamp socket 3 mounted centrally of the reflector, and lamp 4 detachably associated with the socket by a bayonet joint connection. The base of the lamp and the socket are grounded to the frame of the automobile forming as well one connection for the battery used in the car lighting system. The connecter switch of the invention in the illustrated embodiment thereof is shown as detachably associated with the base of the lamp, although it is contemplated that similar connection may be made with the socket of the lamp or other forms of translating devices which generate heat.

The connecter switch comprises an insulating base 5 of any suitable insulation having mounted on the outer side thereof a metallic conductor plate 6, contact 7 and binding post 8 for establishing connection with an electrical conductor. The conductor plate has bent end portions engaging the ends of the base and the plate and binding post are preferably formed of a single piece of metal with the conductor connection forming the overlying portion at one end of the insulation base block in the assembled position. The opposite side of the insulating base has fastened thereto a formed bi-metallic thermostatic element 9 and a cooperating spring clip structure 10 electrically connected to the thermostat. The clip is disposed transversely of the thermostat and comprises as shown a circular bent band adapted for frictional engagement with a socket or lamp base although other equivalent forms of clips are contemplated in use of the invention.

The thermostat comprises a bi-metallic formed member with a forwardly extending portion 11 provided with a curvature corresponding to the contour of the lamp with which it is to be associated and with the free end 12 return bent to form a loop and a substantially straight arm carrying at its end contact 13 for contacting engagement with contact 7. The bi-metallic element is so constructed that contacts 7 and 13 are normally in engagement when the cooperating lamp is not energized or in other words when the thermostat is in the cool state. When the lamp with which the thermostat is connected is lighted, heat therefrom expands the loop and opens the contacts thus breaking a metallic circuit which in the cool state of the thermostat may be traced through a conductor connected with the binding post, through contacts 7 and 13, thermostat 9, clip 10 and the lamp base and socket to ground. The thermostat is formed to fit closely the outer surface of a lamp bulb in the socket and the combined connecter and switch serves to readily establish a circuit through the device when the lamp is out and to break the circuit when the lamp is lighted.

For indicating the condition of the light shown in Fig. 2 and the running lights of Figure 1 at a position remote from the lights, there is employed a signal circuit including a ground connection 14 to one terminal of a source 15 of electrical energy, a conductor 16 from the other terminal of the source to a signal device 17 shown as an indicating light located in a position to be seen by an operator of the automobile, connection 18 from the signal device to the binding terminal of the connecter switch structure or structures, as the case may be, where under the control of the thermostatic switch the circuit is adapted to be continued to ground or broken in the manner previously described dependent on a condition of the lamp or lamps. A manually operable switch 19 is included in the signaling circuit serving to disable the signal circuit when the main electric lighting system is not in use.

Referring in particular to Figs. 4 and 5, the invention is shown therein in modified form for association with a standard screw threaded lamp socket and cooperating light bulb structure. The modified form of device may also be employed with other commercial types of outlets accommodating ordinary electric lights. The structure of the modified form is identical with that shown in Fig. 3 of the drawing except for the modified attachment member for associating the structure with a lamp socket. In lieu of the spring clips shown in Fig. 3, there is employed a metallic conducting member 20 having a depending narrow strip portion in contact with the thermostatic element and suitably fastened therewith to the insulating base 5. The element 20 is provided above the fastening portion 21 with curved arms 22 having a curvature corresponding to the outside diameter of a standard screw shell of a lamp socket. This mounting member is made from relatively thin stock to enable its insertion within a socket shell 23, as illustrated in Fig. 5, in frictional engagement between the screw threaded lamp socket 24 and its conventional tubular insulating shell 25. In the inserted position, as illustrated in Fig. 5, the connecter switch structure will be held securely in place by frictional engagement with the screw shell and the surrounding insulating member. If desired, the attachment member 20 may be formed with screw thread corrugations to facilitate its insertion in the socket. The thermostatic element is suitably formed for association with the lamp bulb 26 so that it is subjected to heat from the bulb when the lamp is energized. A signal circuit including the source of energy 15, switch 19 and signal element 17, may be connected between the binding post and the thermostat and attachment member. This circuit, as illustrated, shows the source of energy as a battery, but it will be obvious to those skilled in the art that a branch circuit may be utilized from the main lighting system. The arrangement is such that when the lamp 26 is illuminated, the thermostat loop expands and breaks the signaling circuit at the contacts 7 and 13. In case the lamp should burn out or become broken, cooling of the thermostat will produce a closing of the contacts to energize the lamp 17 in the signal circuit.

Signal circuits utilizing the connecter switch members may be readily associated with the lamps in already-existing lighting circuits without modifying the structures of the lighting systems, connecters or translating devices. This provides in effect a simple indicating means which can be attached to any lighting circuit and in connection with remotely located lights to indicate their operating condition. This is highly important in connection with the lighting systems of automobiles and in this connection it is only necessary to apply a switch connecter to the lamp bases or sockets in the running light structures and connect therewith suitable conductors, control devices and the signal devices.

In operation, with the lighting system of an automobile, the signaling circuit may be under the control of the main lighting switch or a separate control switch can be employed. Assuming the connecter switch structures to be associated with the several lights in a vehicle lighting system and all of the lights thereof to be in operable condition, the thermostatic switches normally closed when the lights are out will be open when the lights are energized, thus breaking one side of the signaling circuit. The thermostatic switches will remain open as long as the lights are energized. If one or more of the lights should fail due to breakage or burning out, the associated thermostatic switch will immediately cool and thereby establish the signaling circuit inclusive of the signal lamp so positioned as to be immediately drawn to the attention of an operator of the vehicle, thus apprising him of the failure of one of the running lights.

In the preferred illustrated embodiment, the connecter clip is shown as conductively associated with the bimetallic member for the purpose of utilizing the ground side of the lighting circuit as a connection. The clip serves as a support for the switch structure and allows the quick detachable association of the switch with an existing heating element to control a circuit, the conductors of which are connected with the bimetallic member 11 and contact 7, in response to the condition of the heating means. Such a circuit may include a signal lamp or other means which are to be operated in response to condition of the heating means.

From the foregoing description, it will be seen that the invention provides a combined connecter and thermostatic switch structure which requires no modification of existing lamps and sockets for its installation. The invention also provides for quick installation of lamp failure indicators and circuits therefor in any desired application where an indication is necessary remote from the point of illumination.

While the invention has been described in connection with a preferred embodiment, it is to be understood that the words which have been used are words of description rather than of limitation and that changes within the purview of the appended claims may be made without departing from the true scope and spirit of the invention in all its aspects.

We claim:

1. The combination with an incandescent lamp having a metallic base, a thermostatic switch including a bimetallic member formed to correspond with the contour of the lamp bulb, and a detachable connecter member associated with the switch structure for frictionally engaging the base of the lamp.

2. A combined connecter and thermostatic switch comprising an insulating base, a binding terminal and contact mounted on one side of the base a formed bimetallic thermostat mounted on the side of the base opposite to the binding terminal and contact structure, a contact on the free end of the thermostat for cooperation with the first mentioned contact, and a quick-detachable connecter for associating the structure and a lamp socket assembly.

3. A combined connecter and thermostatic switch comprising an insulating base, a binding terminal and contact mounted on one side of the base, a formed bimetallic thermostat mounted on the side of the base opposite to the binding terminal and contact structure, a contact on the free end of the thermostat for cooperation with the first mentioned contact, and a quick-detachable connecter for associating the structure with a lamp socket assembly, said connecter including resilient means for frictionally engaging the lamp socket assembly.

4. A connecter switch comprising an insulating body, a thermostatic switch mounted thereon, said switch including contacts adapted to engage and disengage on movements of the thermostat, and a connecter comprising a spring clip conductively associated with the thermostat for detachably connecting the connecter switch structure to a heating means.

5. In combination, a lamp socket having a screw shell contact and an insulating body surrounding and insulating said contact, a thermostatic switch having a bimetallic member formed for cooperation with a lamp bulb when inserted in the socket, and means including a member frictionally engaged between the shell contact and surrounding insulating body for supporting the switch by the socket.

6. In combination, a lamp socket having a screw shell contact, a surrounding insulating covering for said screw shell contact, a thermostatic switch having a bimetallic member formed to cooperate with an incandescent lamp for use in the lamp socket and a support for the switch including a member in frictional engagement with the outer surface of the shell contact of the socket.

7. In combination, a lamp socket having a screw shell contact and an insulating body surrounding and insulating said contact, a combined connecter and thermostatic switch including a member for frictional engagement between the contact and insulating body, and an incandescent lamp associated with the socket, said switch comprising a bimetallic member formed to the contour of the bulb of the lamp.

8. A connecter switch structure comprising an insulating base, a thermostatic switch including a pair of contacts supported by the base, said switch comprising a formed bimetallic member movable in response to heat conditions to open and close the contact, and a quick-detachable connecter connected with the said bimetallic member for detachably mounting the switch structure on an electrical translating device.

9. A combined connecter and thermostatic switch for quick detachable association with a heating means, said connecter switch structure including a bimetallic member formed to correspond with the contour of the heating means, and a detachable connecter member for frictionally engaging the heating means to position the thermostatic switch close to said means.

10. The combination with a heating means, a thermostatic switch for controlling an electric circuit including conductors connected to the switch, said switch including a fixed contact and a cooperating bimetallic contact member formed to correspond with the contour of the heating means so as to be responsive to heat conditions immediately adjacent the heating means, and a spring clip for quick detachable association of the switch with the heating means, whereby the switch and a connected circuit to be controlled thereby may be detachably associated with the heating means and controlled by heat generated by said means.

ALBERT C. SMITH.
CHARLES F. ROBBINS.